(12) United States Patent
Neubrand

(10) Patent No.: US 7,950,718 B2
(45) Date of Patent: May 31, 2011

(54) CONVERTIBLE SOFT TOP WITH FINS

(75) Inventor: Frank Neubrand, West Bloomfield, MI (US)

(73) Assignee: Wilhelm Karmann GmbH, Munich (DE)

( * ) Notice: Subject to any disclaimer, the term of this patent is extended or adjusted under 35 U.S.C. 154(b) by 111 days.

(21) Appl. No.: 12/346,410

(22) Filed: Dec. 30, 2008

(65) Prior Publication Data
US 2010/0164247 A1    Jul. 1, 2010

(51) Int. Cl.
*B60J 7/12* (2006.01)
*B60J 7/20* (2006.01)
(52) U.S. Cl. .......... 296/107.09; 296/107.07; 296/107.08
(58) Field of Classification Search .................. 296/108, 296/107.08, 107.09, 17.07, 146.14, 107.15, 296/107.07
See application file for complete search history.

(56) References Cited

U.S. PATENT DOCUMENTS

| 6,637,802 | B2 * | 10/2003 | Obendiek | 296/108 |
| 6,832,805 | B2 | 12/2004 | Quindt et al. | |
| 7,404,587 | B2 * | 7/2008 | Brockhoff | 296/107.17 |
| 2004/0084929 | A1 * | 5/2004 | Neubrand | 296/107.15 |
| 2007/0194594 | A1 | 8/2007 | Heselhaus | |

* cited by examiner

*Primary Examiner* — Dennis H Pedder
(74) *Attorney, Agent, or Firm* — Gifford, Krass, Sprinkle, Anderson & Citkowski, P.C.

(57) ABSTRACT

A convertible soft top for a motor vehicle is provided. The convertible soft top has a front portion and a rear portion, the top also having and movable between an extended position and a retracted position. The top includes a fabric cover that extends across the front portion and the rear portion, the fabric cover forming a pair of spaced apart fins that extend from the front portion in a rearwardly direction when the top is in the extended position. The convertible soft top is dimensioned such that a motor vehicle with a conventional opening for heretofore convertible tops can be used with the soft top of the instant invention.

15 Claims, 5 Drawing Sheets

CONVERTIBLE SOFT TOP WITH FINS

FIELD OF THE INVENTION

The present invention is related to a convertible top for a motor vehicle, and in particular to a convertible soft top that has fins when in an extended position and fits within a conventional opening of a motor vehicle when in a retracted position.

BACKGROUND OF THE INVENTION

Convertible tops for motor vehicles are known. In addition, convertible tops having a "soft top", also known as a "convertible soft top" or a "soft top convertible", are known wherein a fabric cover extends across and between a pair of lateral frame parts that extend in a longitudinal direction of the vehicle. A convertible soft top can also include one or more bows that extend transversely from one lateral frame part to the other lateral frame part. In this manner, a frame is provided that supports the fabric cover and provides a top for a passenger compartment of the motor vehicle.

Convertible tops can also be designed in order to exhibit a pair of spaced apart fins that extend in a rearwardly direction from a top or front portion of the top. Such fins, also known as flying buttresses, provide an aesthetically pleasing and/or sporty look to the motor vehicle. However, heretofore convertible soft tops that have fins have required the motor vehicle to have a special or unique shaped opening and/or tonneau cover in order for the fins to be properly deployed when the convertible top is in the extended position and/or for the top to be stored when in the retracted position. As such, a soft convertible top that provides for fins that extend in a rearwardly direction from a front portion of the top when in the extended position and yet can be used with a motor vehicle having a conventional opening for a convertible top would be desirable.

SUMMARY OF THE INVENTION

A convertible soft top for a motor vehicle is provided. The convertible soft top has a front portion and a rear portion. The convertible soft top, front portion and rear portion all have and are movable between an extended position and a retracted position. The front portion can have a header element, a pair of side rails and at least one bow that extends transversely between the pair of side rails. Each of the pair of side rails can have a front leg and a rear leg. The rear portion has a backlight supported within a backlight frame and the top includes a fabric cover that extends across the front portion and the rear portion. The fabric cover forms a pair of spaced apart fins extending from the front portion in a rearwardly direction when the convertible soft top is in the extended position. In addition, the convertible soft top is dimensioned such that a motor vehicle can have a conventional opening to which the soft top is attached, and through which the soft top is stored when in the retracted position.

The fabric cover can be attached to a perimeter of the conventional opening. In addition, the fabric cover can extend between the pair of spaced apart fins in order to form a generally planar portion therebetween, the generally planar portion optionally having a rigid reinforcement panel attached thereto. With the convertible soft top attached to the perimeter of a conventional opening and operable to be stored within a conventional storage space, the convertible soft top can be retrofitted to existing motor vehicles that do not have a convertible soft top with a pair of spaced apart fins.

DETAILED DESCRIPTION OF THE PRESENT INVENTION

Figure 1:
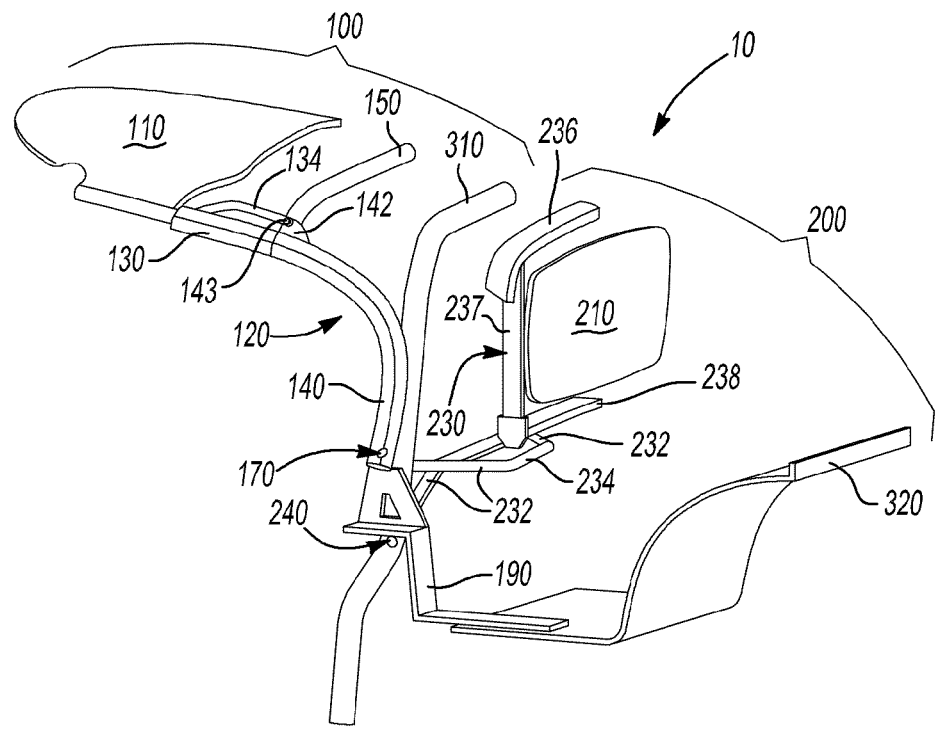
FIG. 1 is a side perspective view of a frame for a convertible soft top according to an embodiment of the present invention.

The present invention discloses a convertible soft top for a motor vehicle. As such, the convertible soft top has utility as a motor vehicle component.

The convertible soft top includes a front portion and a rear portion. The front portion and rear portion are movable between an extended position where the top extends over a passenger compartment of the vehicle and a retracted position where the top is at least partially disposed in a storage area or space. The retracted position can be in the form of a clamshell configuration wherein an inner surface of the top portion faces, and is adjacent to, an inner surface of the rear portion. In the alternative, the retracted position can be in the form of a Z-fold where the front portion and rear portion fold in the form of a "Z".

The front portion can include a header element, a pair of side rails and at least one bow that extends between the pair of side rails. In some instances, each of the side rails is pivotally coupled to the header element with a four-bar linkage and a drive link. In addition, each of the pair of side rails can further include a front leg and a rear leg. The front leg can be pivotally coupled to the header element with the four bar linkage and to the rear leg with a drive link. The rear leg may or may not be pivotally coupled to the motor vehicle.

The rear portion of the convertible soft top can include a backlight supported within a backlight frame. The backlight can be rigid, or in the alternative, flexible. In addition, the rear portion can have a pair of spaced apart fins that extend in a rearwardly direction from the front portion when the convertible soft top is in the extended position. As such, the pair of spaced apart fins can extend rearwardly from the backlight frame towards a rear end of the motor vehicle.

The convertible soft top includes a fabric cover that extends across the front portion and the rear portion. In addition, the fabric cover can provide a top over the passenger compartment of the motor vehicle and can form the pair of spaced apart fins that extend from the front portion in a rearwardly direction when the convertible soft top is in the extended position. The fabric cover can extend between the pair of spaced apart fins and optionally cover an area between the fins when the convertible soft top is in the extended position. The fabric cover that forms the pair of spaced apart fins can also optionally have a transparent window therethrough which affords for a driver and/or occupant to see through the fins when the top is in the extended position.

The convertible soft top is designed and/or dimensioned such that the motor vehicle can have a conventional opening through which the top is stored while in the retracted position. The conventional opening can be a generally rectangular shaped opening within the motor vehicle's body in white, the generally rectangular shaped opening dimensioned to allow access to a storage space for the convertible soft top. It is appreciated that the term "body in white" refers to the car body sheet metal, including doors, hoods, deck lids and the like, that has been assembled or designed before components such as the chassis, motor and the like and trim have been added.

In some instances, the fabric cover can be attached to a perimeter of the conventional opening and the backlight frame can serve as a bow for the convertible soft top. The fabric cover can be attached to the backlight frame, attached to a top member of the backlight frame and/or attached to a perimeter of the backlight frame. The fabric cover can also be attached to a perimeter of the backlight. In addition, the fabric cover can extend between the pair of spaced apart fins to form a generally planar portion when the convertible soft top is in the extended position. The generally planar portion between the pair of spaced apart fins can include a rigid reinforcement panel, the rigid reinforcement panel either attached to and/or sewn within the fabric cover.

A portion of the fabric cover that forms the pair of spaced apart fins, and the generally planar portion that extends between the pair of spaced apart fins, can fold under the backlight and backlight frame when the convertible top is in the retracted position. If the motor vehicle has a roll bar, the roll bar can be used as a bow when the convertible soft top is in the extended position.

Turning now to FIGS. 1-4, a side perspective view of a frame for a convertible soft top according to an embodiment of the present invention is shown generally at reference numeral 10. The convertible soft top 10 can have a front portion 100 and a rear portion 200. The front portion 100 can include a header element 110, a pair of side rails 120 and at least one bow 150 that extends between the pair of side rails 120. It is appreciated that FIGS. 1-4, and FIG. 6, show only half of the convertible soft top 10 with the other half being mirrored to what is shown.

Each of the side rails 120 can include a front leg 130 and a rear leg 140. The front leg 130 can be pivotally coupled to the header element 110, and in some instances is attached using a four bar linkage 132. In addition, the front leg 130, and optionally the four bar linkage 132, can be pivotally coupled to the rear leg 140 using a drive link 134 that is attached to the four bar linkage 132 and to a rear leg bracket 142 at a pivot 143. An optional side rail stabilizer 152 can also be included for stability of the convertible top 10, header element 110 and/or side rail 120 when the top 10 is moving from the extended position to the retracted position, and vice-versa.

The rear portion 200 can include a backlight 210 that is located within a backlight frame 230. The backlight frame 230 can include a top bar portion 236, a bottom bar portion 238 and a pair of side bar portions 237. It is appreciated that the backlight frame 230 can be made from multiple frame portions or sections, or in the alternative, made from a single frame or sections. The bottom bar portion 238 can have a bottom bracket 232 that may or may not be fixedly attached, for example by welding, to the backlight frame 230. In addition, the bottom bracket 232 can have one end pivotally coupled to a support bracket 190 at a pivot axis location 240 with another end pivotally coupled to a second drive link 234. The support bracket 190 can be dimensioned such that it can be rigidly attached to a motor vehicle. In some instances, a motor vehicle can have a roll bar 310 that serves as a bow for the convertible soft top 10. It is further appreciated that the second drive link 234 can have one end pivotally coupled to the bottom bracket 232 and another end pivotally coupled to the support bracket 190, or in the alternative, to the roll bar 310 at pivot 170.

Figure 2:
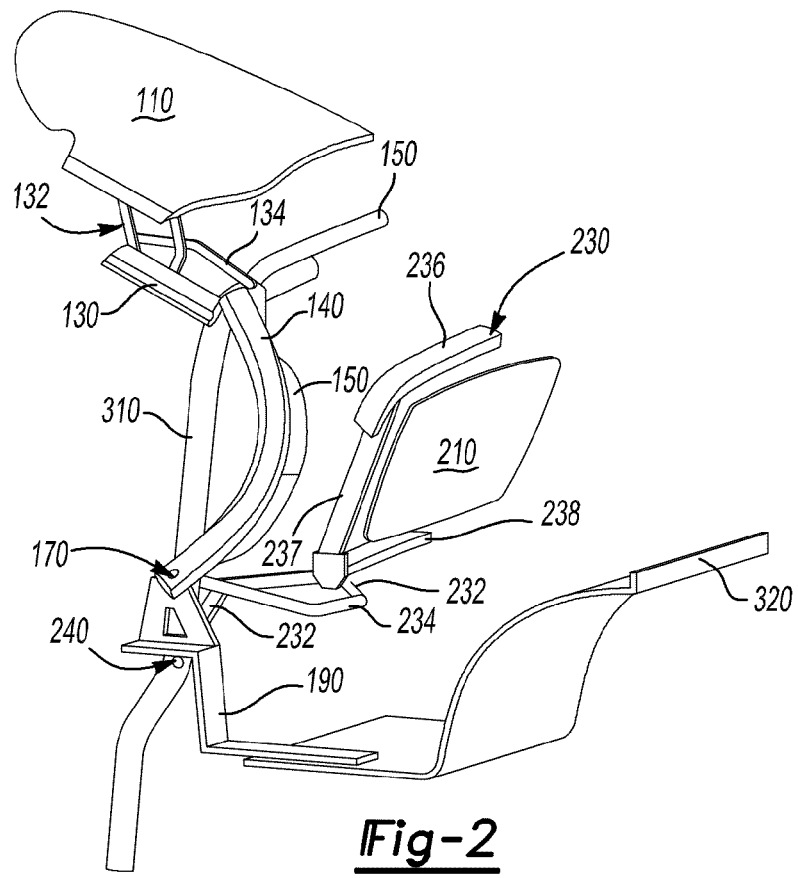
FIG. 2 is a side perspective view of the embodiment shown in FIG. 1 wherein the frame is moving from an extended position towards a retracted position.
Figure 3:
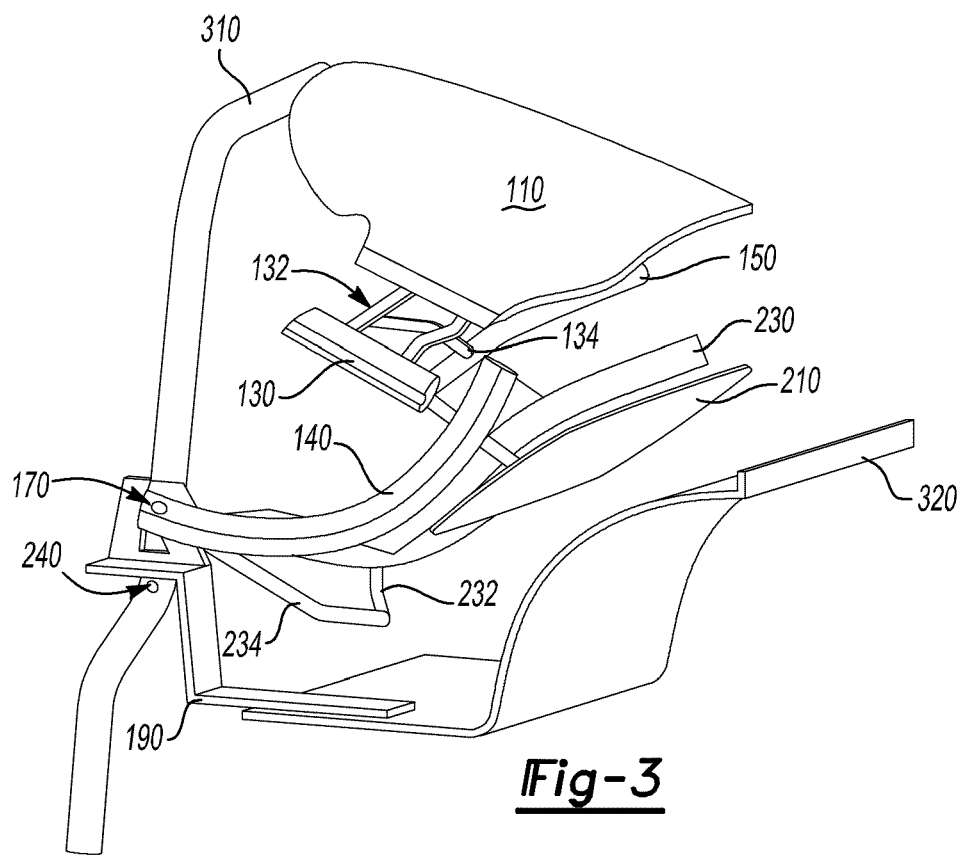
FIG. 3 is a side perspective view of the embodiment shown in FIG. 2 illustrating the frame continuing to move towards a retracted position.
Figure 4:
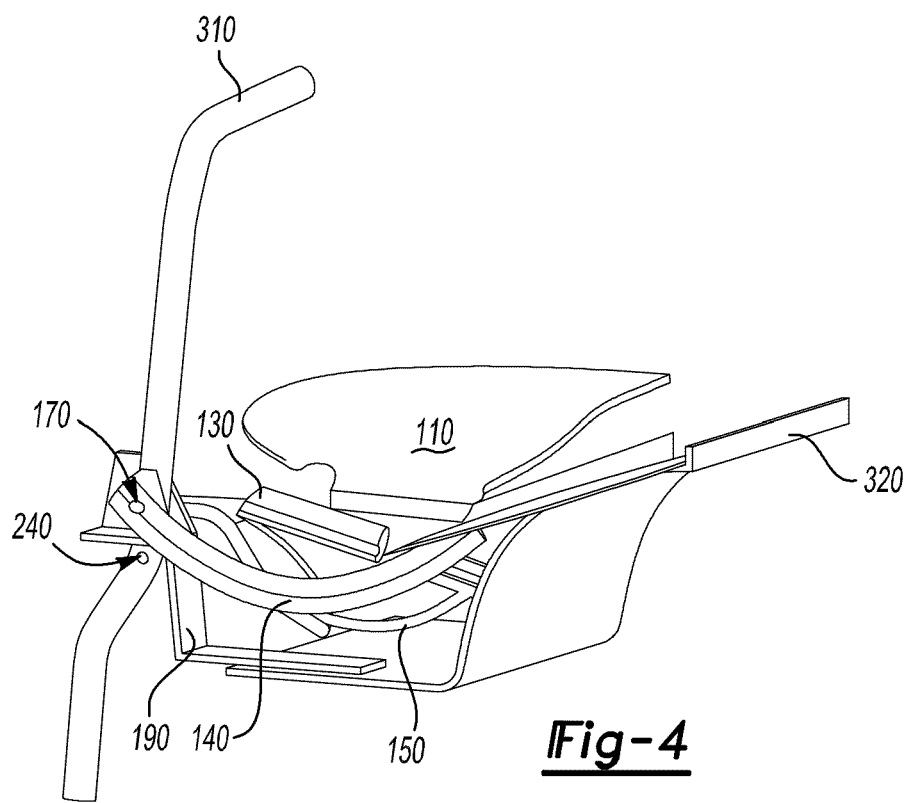
FIG. 4 is a side perspective view of the embodiment shown in FIG. 3 illustrating the frame being in the retracted position.

As illustrated in FIGS. 2-4, the convertible soft top 10 is operable to move from the extended position to the retracted position. The four bar linkage 132 and the first drive link 134 affords for the front portion 100 to fold in a clamshell configuration with respect to the rear portion 200. It is appreciated that the motor vehicle can have a panel 320 that affords for a storage space behind the passenger compartment for the convertible soft top 10.

Figure 5:
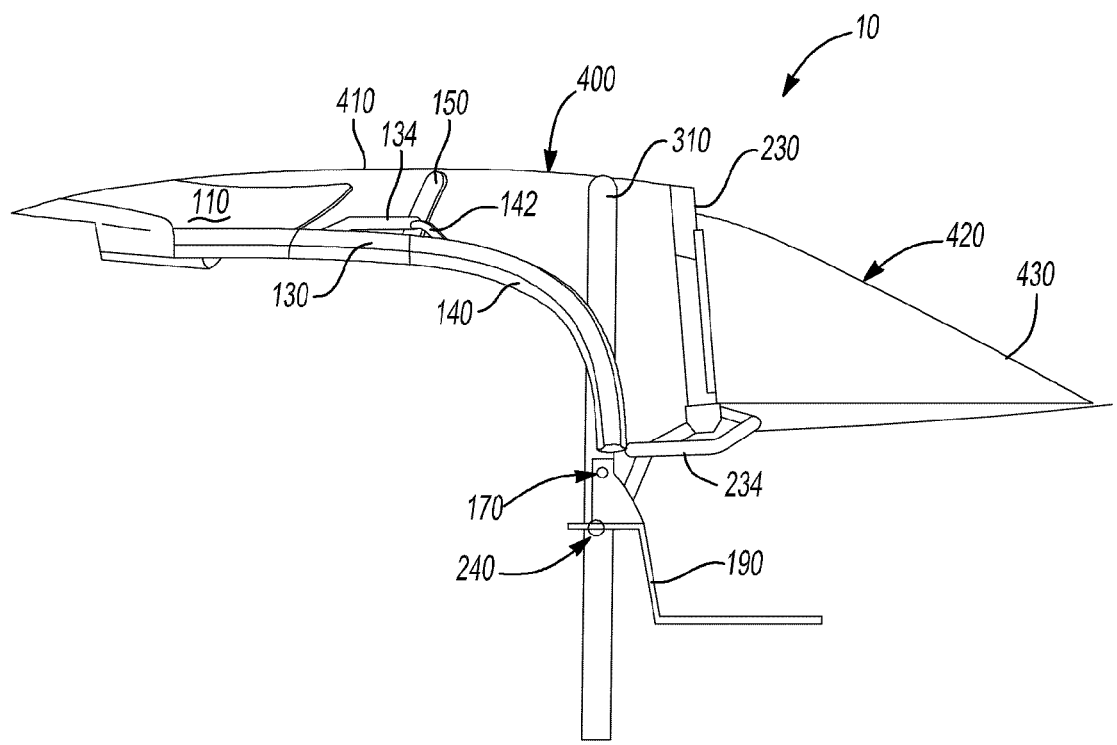
FIG. 5 is a side view of the embodiment shown in FIG. 1 illustrating the convertible soft top in an extended position.
Figure 6:
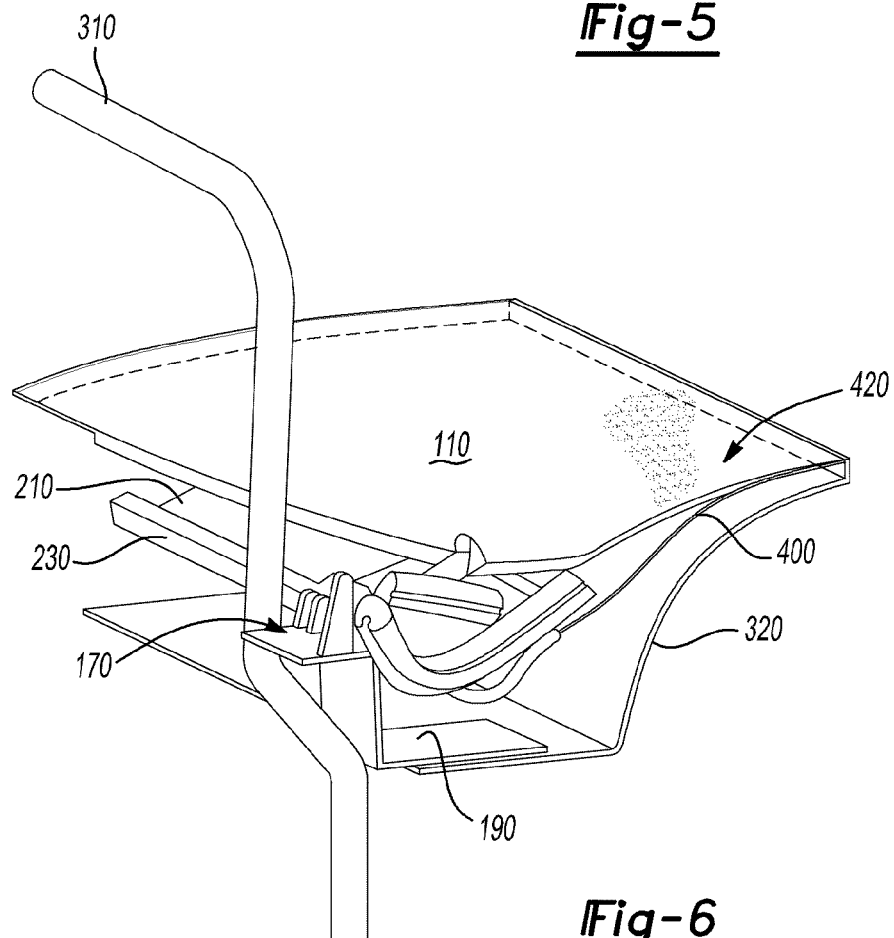
FIG. 6 is a front view of the embodiment shown in FIG. 4.
Figure 7:
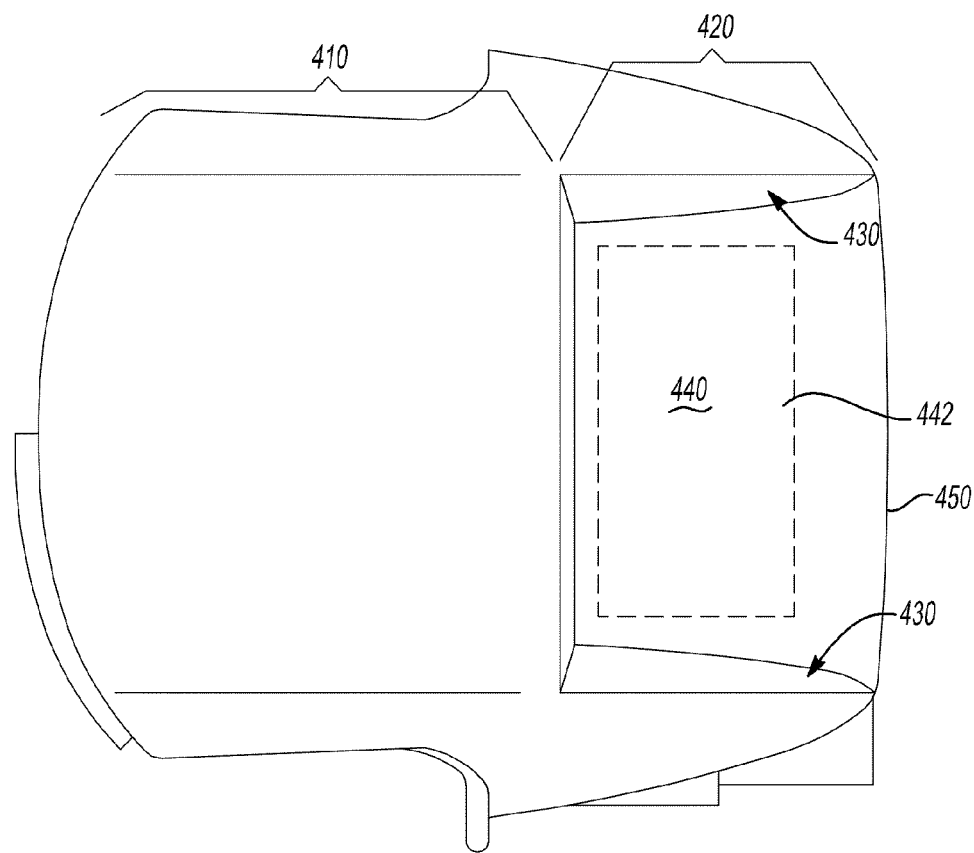
FIG. 7 is a top view of the embodiment shown in FIG. 5.

Turning now to FIG. 5, a side view of the convertible soft top 10 is shown with a fabric cover 400 extending across the frame. The fabric cover 400 has a front portion 410 and a rear portion 420. The front portion 410 can extend across the header element 110, the bow 150, the roll bar 310 if present, and the backlight frame 230. The rear portion 420 forms a pair of spaced apart fins 430, best shown in FIGS. 7 and 8. FIG. 6 shows a front perspective view of the embodiment 10 illustrating that the fabric cover 400 that forms the rear portion 420 can fold underneath the backlight frame 230 and the backlight 210 when the top is in a retracted position. In addition, the header element 110 can serve as a cover for the convertible top 10 when it is in the retracted position.

Figure 8:
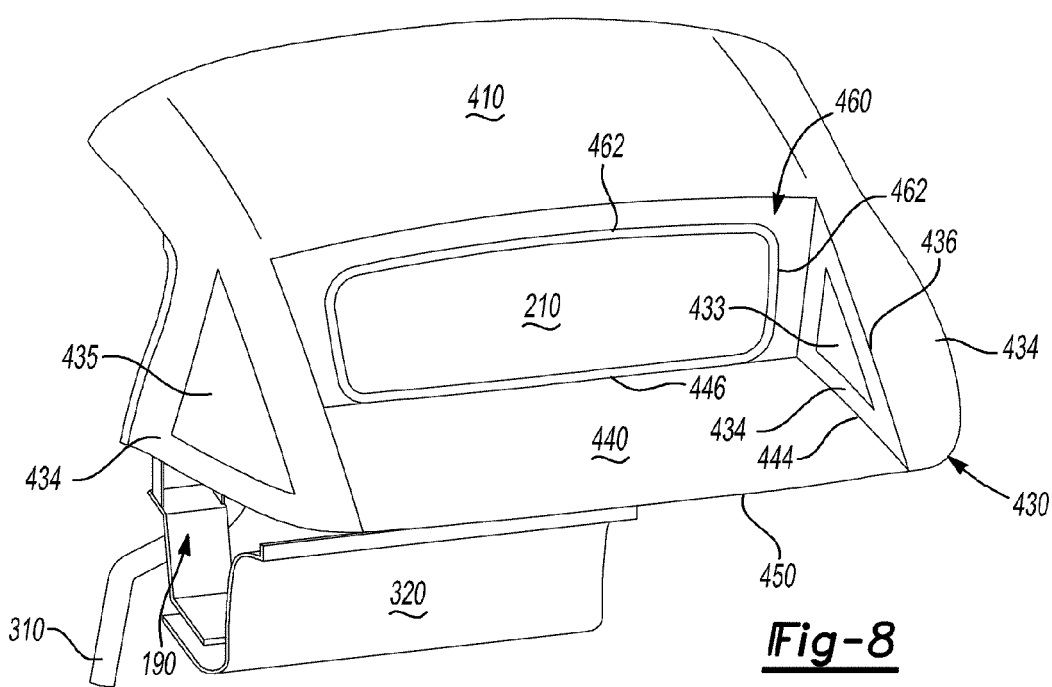
FIG. 8 is a rear perspective view of the embodiment shown in FIG. 7.
Figure 9:
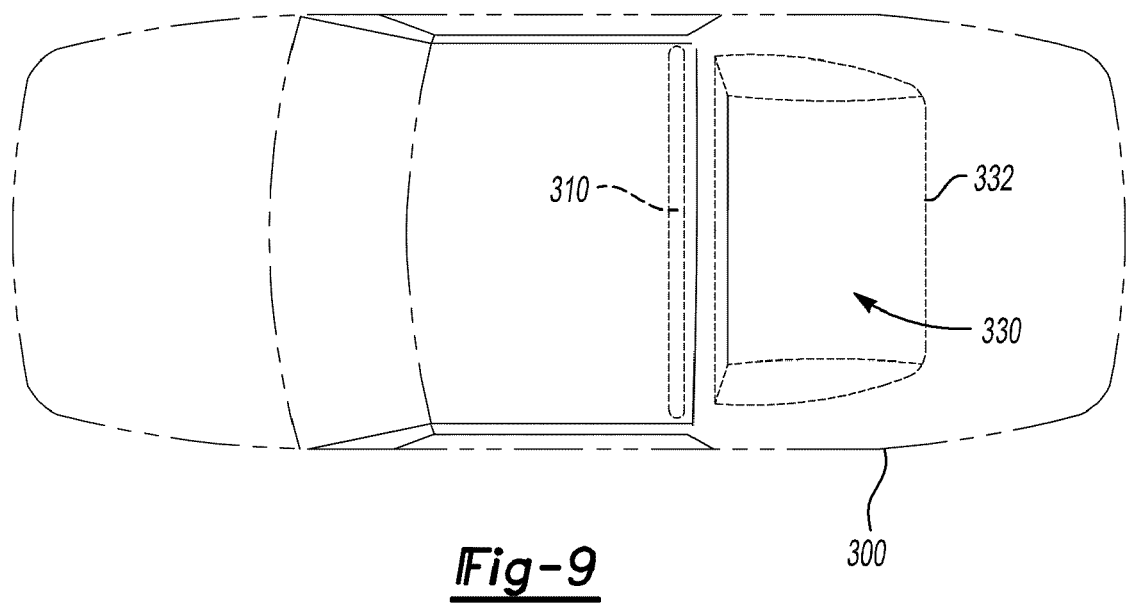
FIG. 9 is a top view of a motor vehicle having a conventional opening for a convertible soft top.

Turning now to FIGS. 7-10, FIG. 7 illustrates a top view of the convertible soft top 10 with the rear portion 420 forming the pair of spaced apart fins 430. The fabric cover 400 can extend between the pair of spaced apart fins 430 and form a generally planar portion 440. The generally planar portion 440 can have a rigid reinforcement panel 442 attached thereto. In some instances, the rigid reinforcement panel 442 is sewn within the fabric cover 400. The rear portion 420 can also have a perimeter 450 that attaches to the motor vehicle. In some instances, the motor vehicle can have a conventional opening 330 as shown in FIG. 9. In addition, the perimeter 450 of the fabric cover 400 can be attached to a perimeter 332 of the opening 330.

Figure 10:
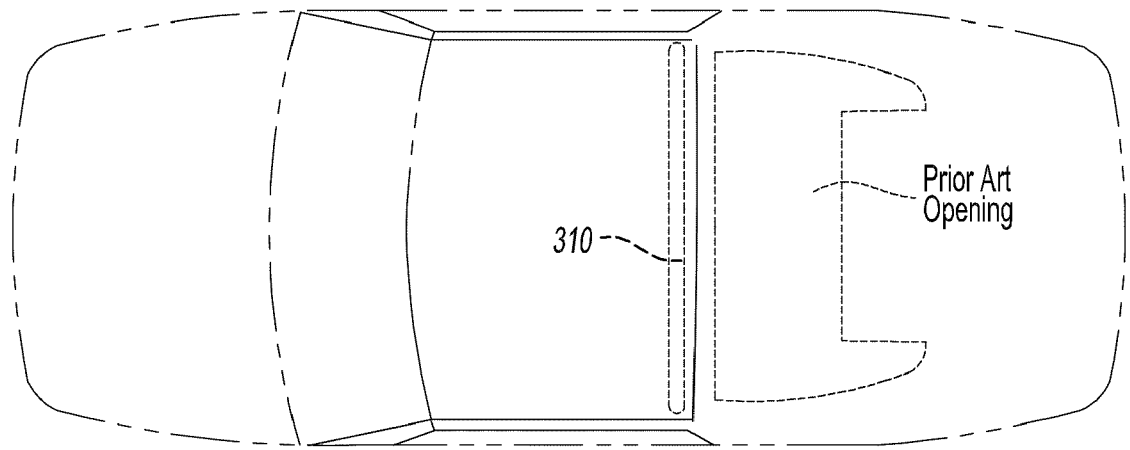
FIG. 10 is a top view of a prior art opening for a motor vehicle having a convertible soft top with a pair of spaced apart fins extending from a front portion of the soft top.

It is appreciated from FIG. 9 that the conventional opening 330 can have a generally rectangular shape, particularly when compared to a typically designed and/or shaped opening for a convertible top having fins as shown as shown in FIG. 10. Stated differently, the opening 330 does not have a shape complimenting the pair of spaced apart fins 430 when the top 10 is in the extended position as prior art openings illustrated in FIG. 10 typically do. Stated in yet a different manner, a rearward portion of the perimeter 332 can extend from, and between, a most rearward portion of the pair of spaced apart fins 430 and remain generally parallel with the rear end of the motor vehicle.

Looking specifically at FIG. 8, the pair of spaced apart fins 430 can each have an inner side 432 and an outer side 434. In some instances, the inner side 432 can have a transparent window 433 therewithin. In addition, the outer side 434 can have a transparent window 435 therewithin. The window 433 and/or window 435 can afford for viewing from the passenger compartment through the fins 430 and thereby aid a driver and/or passenger to see behind and/or to the side of the vehicle. It is appreciated that the window 433 and/or 435 can be rigid, or in the alternative, can be flexible. For example and for illustrative purposes only, the window 433 and/or 435 can be made from rigid glass, or in the alternative, be made from a flexible plastic sheet. It is further appreciated that the window 433 and/or 435 can be a clear opening within the fin with no material present.

Extending between the inner side 432 and the outer side 434 can be an upper ridge 436. In addition, a fold line 444 can extend between the generally planar portion 440 and the inner side 432 of the fin 430. Likewise, a fold line 446 can extend between the generally planar portion 440 and a backlight fabric portion 460 that surrounds the backlight 210. The backlight fabric portion 460 can have a perimeter 462 that is attached to the perimeter of the backlight 210.

It is appreciated that the size of the backlight 210 can be as large as the backlight frame 230. The backlight frame 230 can be packaged with the backlight 210 without having a crowned backlight or having to reduce the size of the backlight in order to fold the fabric cover 400. In addition, a conventional roadster top with a fixed, or in the alternative, a floating five bow, can be retrofitted with a convertible soft top according to the soft top 10 without having to change the body in white of the motor vehicle. It is further appreciated that the five bow top falls within the scope of the present invention with a standard five bow top converted to a fin top by changing the fabric cover cut and the backlight attachment and angle. The frame components such as the header element 110, side rails 120, bow 150, backlight frame 230 can be made from any material known to those skilled in the art, illustratively including metals, alloys, plastics, ceramics and the like. The backlight 210 can be made of glass, plastic, etc. The fabric cover 400 can be any fabric cover material with suitable properties to be used as a convertible soft top material, illustratively including fabric made from polymer materials, natural materials, metallic materials and combinations thereof.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. A motor vehicle with a convertible soft top comprising:
a vehicle body having a passenger compartment and a storage compartment located behind said passenger compartment, said vehicle body also having a windshield disposed in front of said passenger compartment, said windshield having a header;
a convertible top moveable between an extended position wherein said convertible top extends over said passenger compartment and a retracted position wherein said convertible top is at least partially disposed in said storage compartment;
said convertible top also having a front portion and a rear portion, said front portion and said rear portion each having an inner surface and an opposed outer surface, said inner surface of said front portion and said rear portion facing said passenger compartment when said convertible top is in said extended position and outer surface of said front portion facing a generally upward direction when said convertible top is in said extended position and said retracted position;
said front portion having a header element, a pair of side rails and at least one bow extending between said pair of side rails, each of said pair of side rails having a front leg and rear leg;
said front leg pivotally coupled to said header element and said rear leg;
said rear leg pivotally coupled to said vehicle body;
said rear portion of said convertible top having a backlight supported within a backlight frame, said backlight being generally vertical when said convertible top is in said extended position; and
a fabric cover extending across said front portion and said rear portion, said fabric cover covering a passenger compartment and forming a pair of spaced apart fins extending from said front portion in a rearwardly direction when said convertible top is in said extended position, said fabric cover also extending between said pair of spaced apart fins to form a generally planar portion when said convertible top is in said extended position, said fabric cover covering an area between said pair of spaced apart fins.

2. The motor vehicle with the convertible soft top of claim 1, wherein said motor vehicle has a body in white with said storage compartment for storing said convertible top in said retracted position, said body in white having a generally rectangular shaped opening for said convertible top to enter said storage compartment.

3. The motor vehicle with the convertible soft top of claim 2, wherein said fabric cover is attached to a perimeter of said generally rectangular shaped opening.

4. The motor vehicle with the convertible soft top of claim 1, wherein said backlight frame serves as a bow.

5. The motor vehicle with the convertible soft top of claim 1, wherein said fabric cover is attached to a perimeter of said backlight.

6. The motor vehicle with the convertible soft top of claim 1, wherein said generally planar portion between said pair of spaced apart fins has a rigid reinforcement panel.

7. The motor vehicle with the convertible soft top of claim 6, wherein said rigid reinforcement panel is sewn within said fabric.

8. The motor vehicle with the soft convertible top of claim 1, wherein said fabric cover forming said pair of spaced apart fins and extending between said pair of spaced apart fins folds under said backlight within said backlight frame when said convertible top is in said retracted position.

9. The motor vehicle with the soft convertible top of claim 1, wherein said motor vehicle has a roll bar, said roll bar dimensioned to be used as a bow when said convertible top is in said extended position.

10. The motor vehicle with the soft convertible top of claim 1, wherein said convertible top folds into a clamshell configuration.

11. The motor vehicle with the soft convertible top of claim 1, wherein said front leg is connected to said header element with a four bar linkage.

12. The motor vehicle with the soft convertible top of claim 1, wherein each of said spaced apart fins has a flexible transparent window therein.

13. A motor vehicle with a convertible soft top comprising:
a vehicle body having a passenger compartment and a storage compartment having a generally rectangular shaped opening located behind said passenger compartment, said vehicle body also having a windshield disposed in front of said passenger compartment, said windshield having a header;

a convertible top moveable between an extended position wherein said convertible top extends over said passenger compartment and a retracted position wherein said convertible top is at least partially disposed in said storage compartment;

said convertible top also having a front portion and a rear portion, said front portion and said rear portion each having an inner surface and an opposed outer surface, said inner surface of said front portion and said rear portion facing said passenger compartment when said convertible top is in said extended position and said outer surface of said front portion facing a generally upward direction when said convertible top is in said extended position and said retracted position;

said front portion having a header element, a pair of side rails and at least one bow extending between said pair of side rails, each of said pair of side rails having a front leg and rear leg;

said front leg pivotally coupled to said header element and said rear leg;

said rear leg pivotally coupled to said vehicle body;

said rear portion of said convertible top having a backlight supported within a backlight frame, said backlight being generally vertical when said convertible top is in said extended position; and a fabric cover extending across said front portion and said rear portion, said fabric cover covering a passenger compartment and forming a pair of spaced apart fins extending from said front portion in a rearwardly direction when said convertible top is in said extended position, said fabric cover also extending between said pair of spaced apart fins in a generally planar configuration to form a generally planar portion that covers an area between said pair of spaced apart fins when said convertible top is in said extended position;

said front portion and said rear portion operable to fold into a clam shell configuration when said convertible top is in said retracted position.

14. The motor vehicle with the convertible soft top of claim 13, wherein said fabric cover is attached to a perimeter of said generally rectangular shaped opening.

15. A motor vehicle with a convertible soft top comprising:

a vehicle body having a passenger compartment and a storage compartment having a generally rectangular shaped opening located behind said passenger compartment, said vehicle body also having a windshield disposed in front of said passenger compartment, said windshield having a header;

a convertible top moveable between an extended position wherein said convertible top extends over said passenger compartment and a retracted position wherein said convertible top is at least partially disposed in said storage compartment;

said convertible top also having a front portion and a rear portion, said front portion and said rear portion each having an inner surface and an opposed outer surface, said inner surface of said front portion and said rear portion facing said passenger compartment when said convertible top is in said extended position and said outer surface of said front portion facing a generally upward direction when said convertible top is in said extended position and said retracted position;

said front portion having a header element, a pair of side rails and at least one bow extending between said pair of side rails, each of said pair of side rails having a front leg and rear leg;

said front leg pivotally coupled to said header element and said rear leg;

said rear leg pivotally coupled to said vehicle body;

said rear portion of said convertible top having a backlight supported within a backlight frame, said backlight being generally vertical when said convertible top is in said extended position;

a fabric cover extending across said front portion and said rear portion, said fabric cover covering a passenger compartment and forming a pair of spaced apart fins extending from said front portion in a rearwardly direction when said convertible top is in said extended position; and a transparent window located within said fabric that forms each of said pair of spaced apart fins;

said fabric cover also being attached to a perimeter of said generally rectangular shaped opening and extending between said pair of spaced apart fins in a generally planar configuration to form a generally planar portion that covers an area between said pair of spaced apart fins when said convertible top is in said extended position;

said front portion and said rear portion operable to fold into a clam shell configuration when said convertible top is in said retracted position.

* * * * *